Dec. 22, 1942. A. HENDERSON 2,306,107
FORM FOR MOLDING BUILDING MEMBERS
Filed March 16, 1942 10 Sheets-Sheet 1
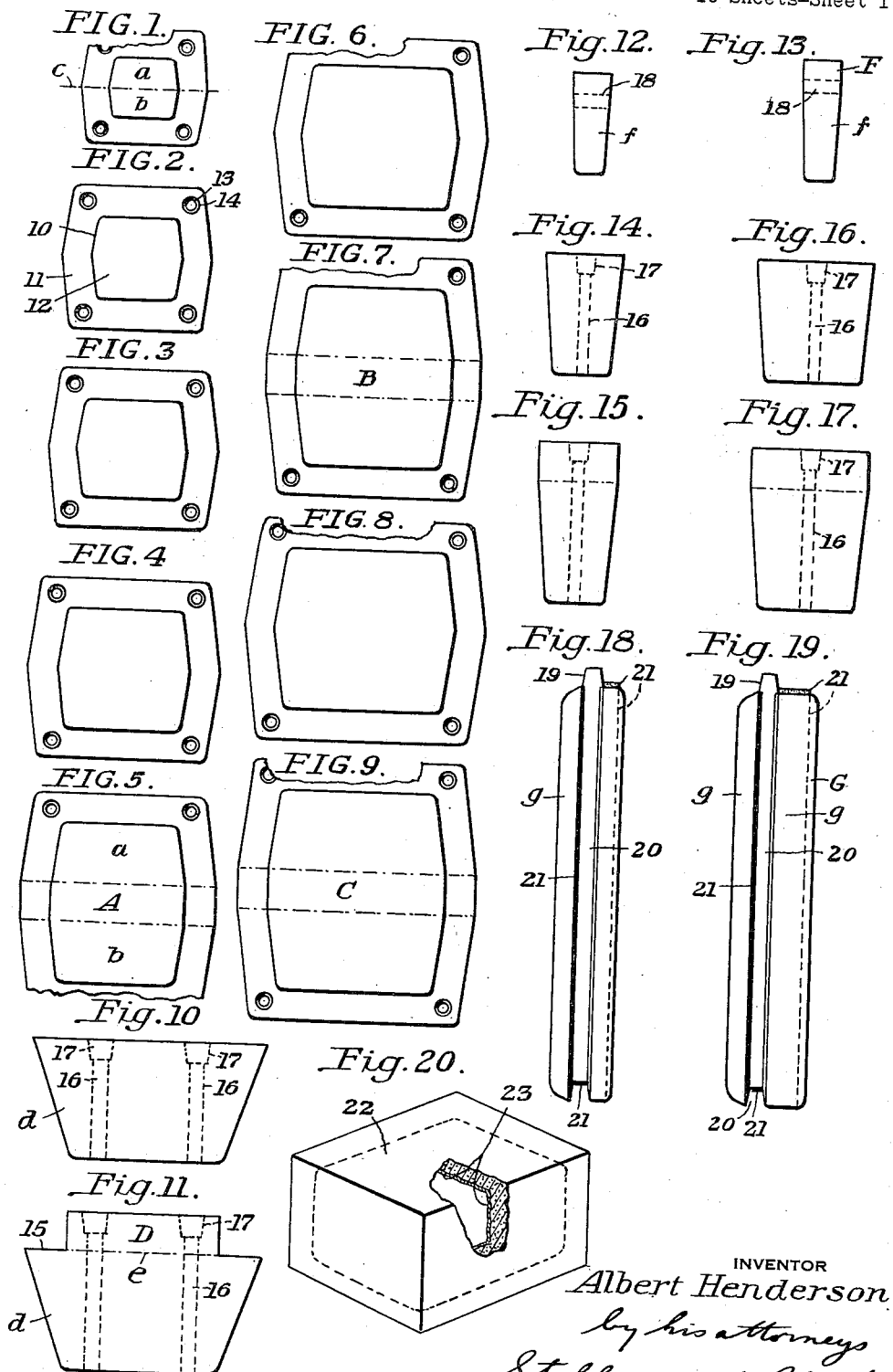
INVENTOR
Albert Henderson
by his attorneys
Stebbins and Blenko Dec. 22, 1942.　　　　A. HENDERSON　　　　2,306,107
FORM FOR MOLDING BUILDING MEMBERS
Filed March 16, 1942　　　10 Sheets-Sheet 2

INVENTOR
Albert Henderson
by his attorneys
Stebbins and Blenko

Dec. 22, 1942.　　　A. HENDERSON　　　2,306,107
FORM FOR MOLDING BUILDING MEMBERS
Filed March 16, 1942　　10 Sheets-Sheet 3

INVENTOR
Albert Henderson
by his attorneys
Stebbins and Blenko

Dec. 22, 1942.  A. HENDERSON  2,306,107
FORM FOR MOLDING BUILDING MEMBERS
Filed March 16, 1942  10 Sheets-Sheet 4

INVENTOR
Albert Henderson
by his attorneys
Stebbins and Blenko

Dec. 22, 1942.  A. HENDERSON  2,306,107
FORM FOR MOLDING BUILDING MEMBERS
Filed March 16, 1942  10 Sheets-Sheet 5
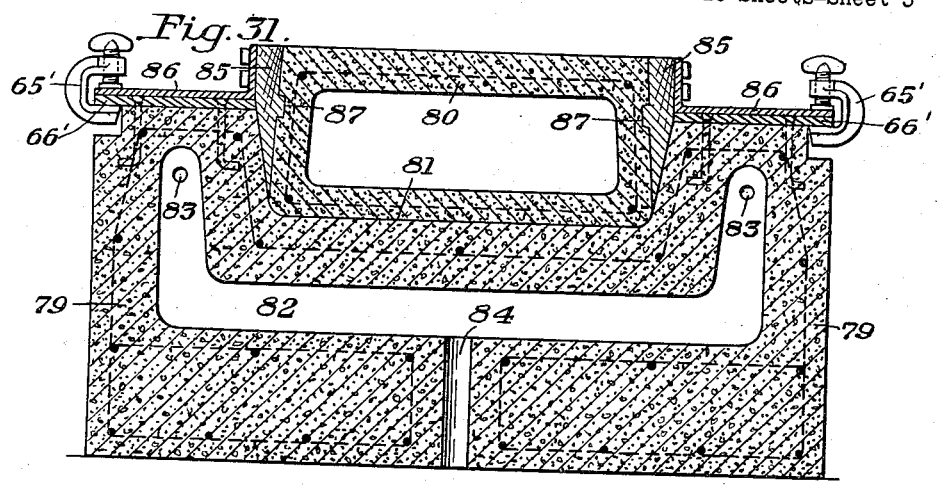
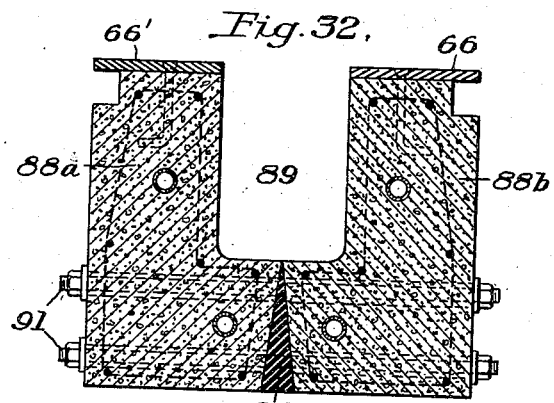
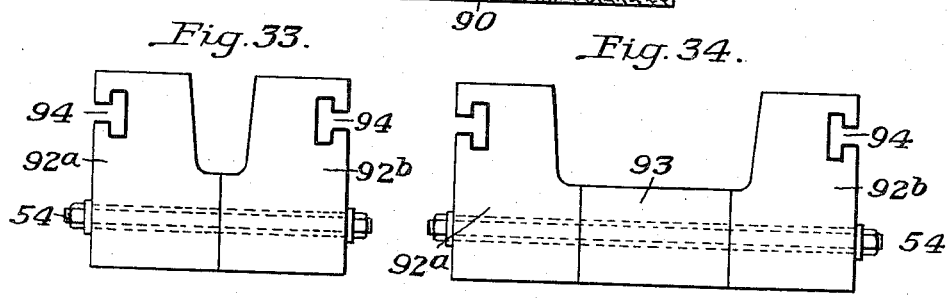
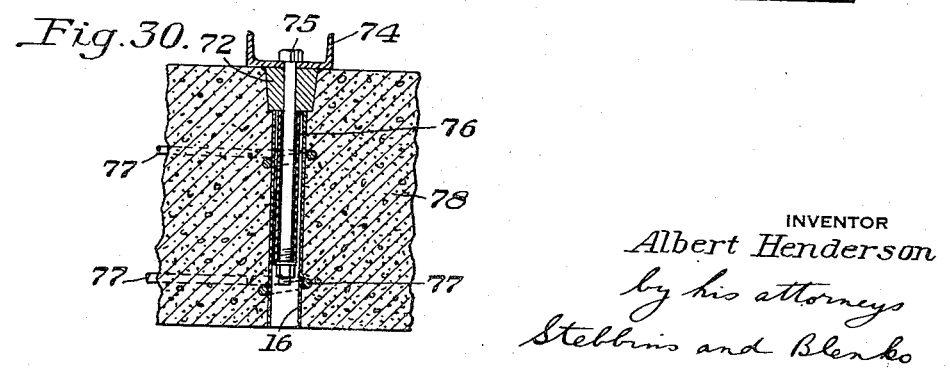
INVENTOR
Albert Henderson
by his attorneys
Stebbins and Blenko Dec. 22, 1942.  A. HENDERSON  2,306,107
FORM FOR MOLDING BUILDING MEMBERS
Filed March 16, 1942   10 Sheets-Sheet 6
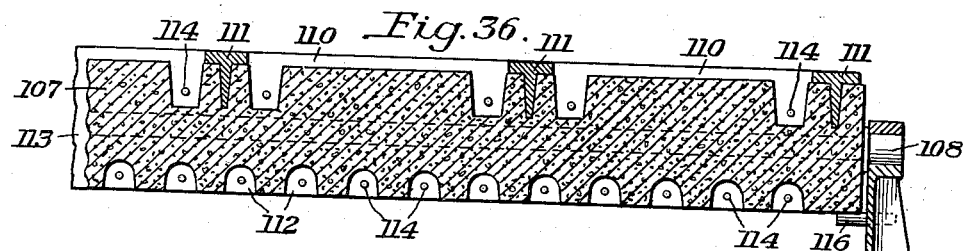
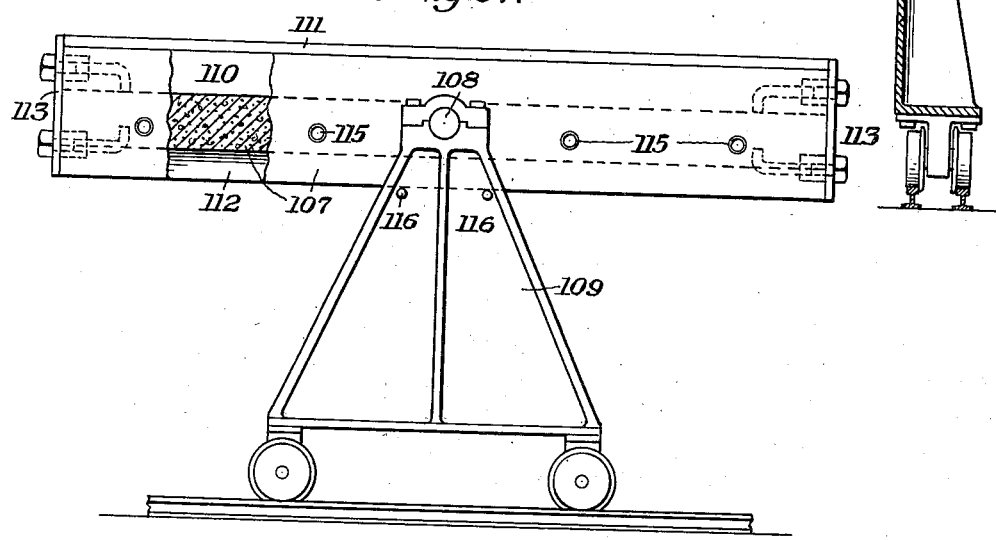
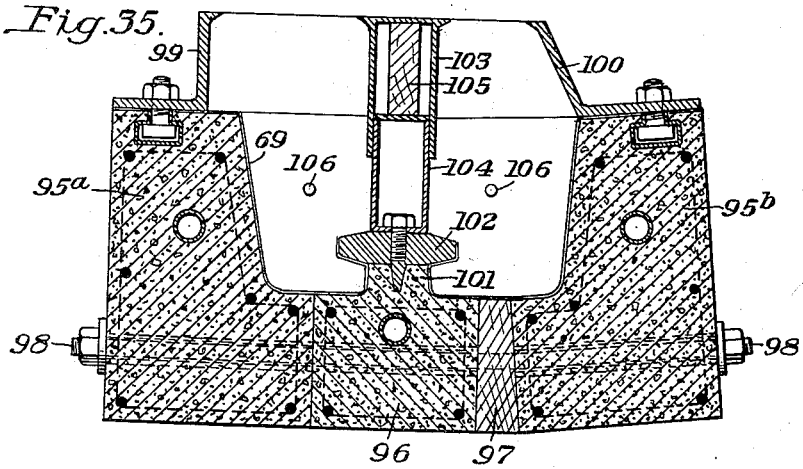
INVENTOR
Albert Henderson
by his attorneys
Stebbins and Blenko

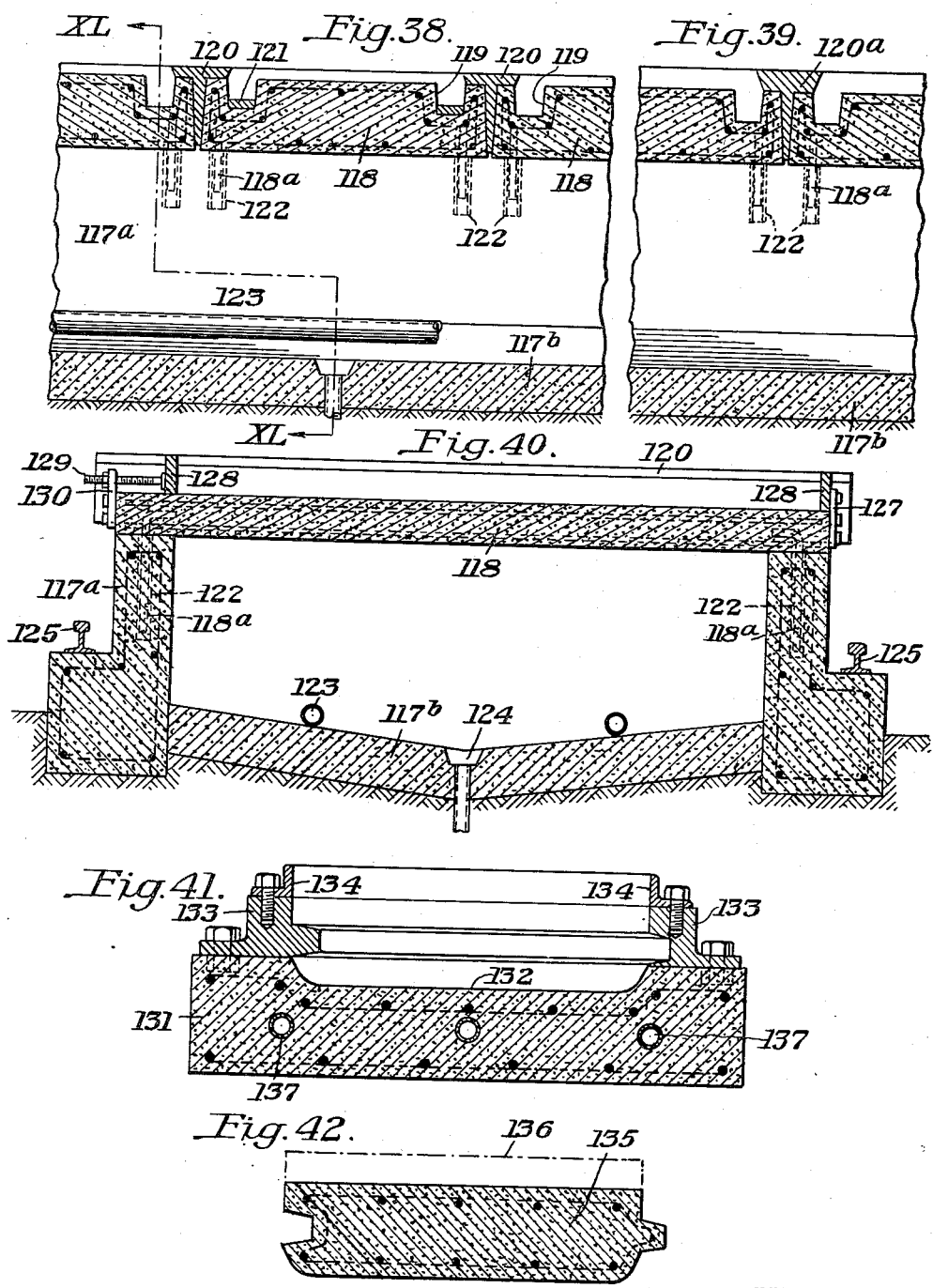

Dec. 22, 1942.  A. HENDERSON  2,306,107
FORM FOR MOLDING BUILDING MEMBERS
Filed March 16, 1942   10 Sheets-Sheet 8
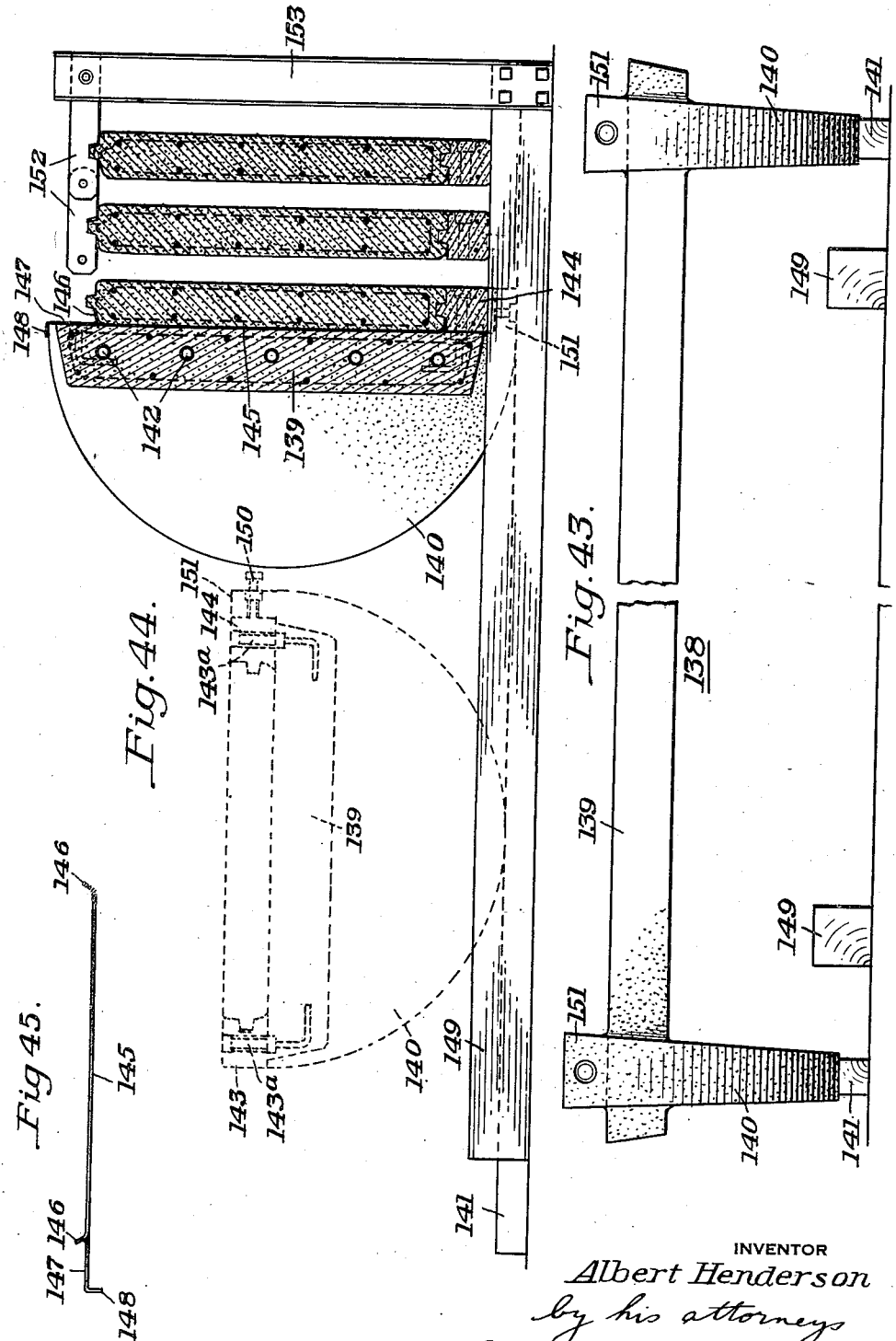
INVENTOR
Albert Henderson
by his attorneys
Stebbins and Blenko Dec. 22, 1942.  A. HENDERSON  2,306,107
FORM FOR MOLDING BUILDING MEMBERS
Filed March 16, 1942   10 Sheets-Sheet 9

INVENTOR
Albert Henderson
by his attorneys
Stebbins and Blenko

Dec. 22, 1942.  A. HENDERSON  2,306,107
FORM FOR MOLDING BUILDING MEMBERS
Filed March 16, 1942   10 Sheets-Sheet 10

INVENTOR
Albert Henderson
by his attorneys
Stebbins and Blenko

Patented Dec. 22, 1942

2,306,107

UNITED STATES PATENT OFFICE 2,306,107

FORM FOR MOLDING BUILDING MEMBERS

Albert Henderson, Edgewood, Pa., assignor to William P. Witherow, Pittsburgh, Pa.

Application March 16, 1942, Serial No. 434,854

14 Claims. (Cl. 25—121)

This invention relates to precast concrete building members and, in addition, to forms for the manufacture thereof.

The use of precast concrete building members has often been proposed but has never been achieved on any substantial scale. I believe this results at least partially from the fact that the forms which have been available heretofore for making such members have been of wood or metal and so constructed that it is necessary to take them apart to remove the molded member. By reason of this construction, liquid concrete tends to leak down through the joints in the mold, particularly under the vibration which is applied to the forms in the usual practice. This leakage produces unsightly fins on the lower corners of the members which must be removed, usually by hand-chipping, with a resultant increase in labor cost. Numerous types and sizes of forms are required, furthermore, for the manufacture of a complete line of members in the sizes most frequently used. Wood forms warp and metal forms rust and are subject to injury as by being bent. The latter also have to be oiled after each use and the oil applied tends to collect at the bottom of the mold and discolor the members formed therein.

I have invented a plurality of series of building members and novel forms particularly suited for the making of such members which avoid the objections to the forms known heretofore. I provide forms made preferably of reinforced concrete and having heating pipes embedded therein thereby to expedite curing of the molded members. The embedded pipes also serve as reinforcing. My forms are so designed that the exposed surfaces of the members molded therein are smooth with rounded corners and entirely free from fins. I accomplished this by making the forms largely of unitary construction, and placing the necessary joints so that any irregularities resulting from leakage will ordinarily not be exposed to view. The members themselves have sections which are tapering, at least in certain portions, whereby the molded members may readily be removed from the forms. To facilitate separation of the members from the forms, the latter may be given a coat of paraffin before pouring.

I have disclosed and claimed in my copending application, Ser. No. 432,209, Precast concrete buildings, a building construction utilizing precast concrete members, and the forms to be described in detail hereinafter are designed particularly for the manufacture of such members.

My forms are adapted to the manufacture of members of different sizes, and sectional areas differing from each other by a predetermined supplemental area. As disclosed in the above-mentioned copending application, my precast building members have a transverse sectional area composed of a portion or portions common to all sizes in a series, and a supplemental area by which certain of the several members of a series differ from each other. Some members of a series, furthermore, may have similar shapes and differ solely in dimensions. My forms are adapted for the manufacture of such series, having a sectional area which is common to various sizes and provisions for a supplemental sectional area. For this purpose I utilize removable side walls or filler members between upper and lower members of the form of my invention.

In order to provide the desired surface on the finished members, I may lay a covering of absorbent material such as burlap or cotton cloth, or Celotex covered with muslin on the interior of the molds. I also may employ a muslin-covered porous concrete for the molds. Either of these alternatives provides for the absorption of surplus water from the concrete. The water thus absorbed is driven off between successive casting operations by heating pipes embedded in the molds. I thus reduce pin holes in the surfaces of the molded members and produce thereon a dense hard surface less likely to craze.

The novel features of construction and the advantages characteristic of my molds will become apparent during the following detailed description and explanation which refer to the accompanying drawings illustrating first, diagrammatically, the principal types of precast members which I contemplate, and then the various forms of molds which I have devised for the manufacture of such members.

Figures 1 through 4 are plan views of a portion of a series of columns of similar shape but different sizes;

Figure 5 is a plan view of a column similar to that of Figure 4 but for the addition of a central rectangular supplemental sectional area;

Figure 6 is a plan view of a further member of the series of columns similar in shape to those of Figure 1 through 4 but larger in size;

Figure 7 is a column similar to Figure 6 but including an additional supplemental sectional area;

Figures 8 and 9 are similar to Figures 6 and 7 showing a still larger column;

Figure 10 is an end elevation of one member of a series of girders;

Figure 11 is a similar view of a further member of the series including a sectional area the same as that of the girders of Figure 10 plus a superposed rectangular supplemental sectional area;

Figure 12 is an end elevation of a member of a series of joists;

Figure 13 is an end view of another member of a series of joists having a sectional area identical with that of the joist in Figure 12 plus a superposed supplemental rectangular area;

Figures 14 and 15 are end elevations corresponding respectively to Figures 12 and 13 showing members of a series of intermediate beams;

Figures 16 and 17 are end views corresponding respectively to Figures 12 and 13 showing members adapted to serve as main beams or secondary girders;

Figure 18 is an end view of one member of a series of precast concrete wall panels or floor or roof slabs;

Figure 19 is a view similar to Figure 18 showing another member of the series having a portion of its section identical with that of the member shown in Figure 18 plus a superposed supplemental rectangular sectional area;

Figure 20 is a perspective view, partly broken away, showing a novel building block constituting one of the precast building members contemplated by my invention;

Figure 30 is a partial longitudinal section through a member such as those shown in Figures 16 and 17, showing one means for positioning the pipe lengths embedded therein adjacent the ends;

Figure 31 is a transverse section through a form adapted for the molding of hollow floor slabs of generally rectangular section which are disclosed in my aforementioned copending application;

Figure 32 is a transverse section through a form for the molding of beams or the like of generally rectangular section;

Figure 33 is an end view of a form suited for the molding of members such as those shown in Figures 14 and 15;

Figure 34 is a view similar to Figure 33 showing how the form of the latter may be modified to adapt it for the molding of members such as those shown in Figures 10 and 16;

Figure 35 is a transverse section through a modified form suited for the molding of special members such as window-sills and coping members;

Figure 36 is a partial transverse section through a reversible form having mold chambers on opposite sides thereof;

Figure 37 is a side elevation of the form shown in Figure 36, partially broken away;

Figure 38 is a partial longitudinal section through a curing chamber having forms extending thereacross;

Figure 39 is a view similar to Figure 38 showing a modification;

Figure 40 is a transverse sectional view through the curing chamber of the form shown in Figure 38, taken along the line XL—XL of the latter;

Figure 41 is a transverse section through a form for making wall panels similar to those shown in Figures 18 and 19;

Figure 42 is a transverse section through one member of a series of wall panels for the molding of which the form of Figure 41 is suited;

Figure 43 is a side elevation of a rocking form support suited for the molding of panels such as that shown in Figure 18;

Figure 44 is a transverse section through the form support of Figure 43 in tilted position, showing the method of operation;

Figure 45 is an end elevation of a metal plate adapted to be disposed on the form support of Figures 33 and 34;

Figure 21:
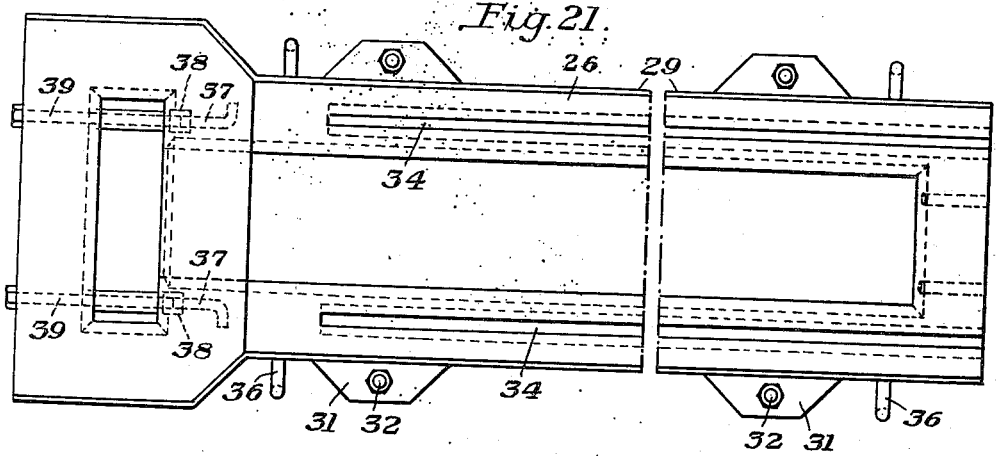
Figure 21 is a top plan view of the upper member of a two-part mold suited for the manufacture of columns such as shown in Figures 1 through 4.

Referring now in detail to the drawings, Figures 1 through 9 illustrate a series of precast concrete members, specifically columns, of gradually increasing sectional area. Several members of the series, i. e., those shown in Figures 1 through 4, 6 and 8, have similar shape in section including a pair of tapering or trapezoidal areas $a$ and $b$ abutting along surfaces indicated by chain line $c$. Other members of the series, i. e., those shown in Figures 5, 7 and 9 have sectional areas similar to those of the next smaller members, viz., those shown in Figures 4, 6 and 8, respectively, with the addition of supplemental rectangular sectional areas A, B and C indicated by spaced parallel chain lines, between the portions a and b with tapering sides.

Each column indicated generally at 10 includes a base 11 and a shaft 12 upstanding therefrom. The outline of the base in plan conforms to that of the shaft. The base also tapers inwardly toward the bottom thereof. Pipe lengths 13 are embedded in the corners of the base defining holes for the reception of anchor bolts embedded in field-cast footers. At the upper ends of the holes defined by the pipe lengths 13, nut sockets 14 are formed to receive nuts threaded onto the ends of the anchor bolts projecting through the pipe lengths. After placement and tightening of the nuts, the sockets 14 are filled with grout to fireproof the nut and anchor bolts and to protect them against corrosion.

The taper of the sides of the portions a and b of the sections of the various columns of the series is the same for each member, preferably 1:12. As will be apparent from the drawings, certain members of the series differ from the next smaller and larger members only in exterior dimensions, having the same shape, while other members of the series have the rectangular supplemental sectional area disposed between the portions of the sectional area with tapering sides which are common to all members of the series. This provides a series of columns covering a wide range of sizes and safe-load capacities. I may, for example, provide columns ranging from 12" x 12" to 12" x 24" by increasing one dimension in 4" increments. Similarly, I may provide a series of sizes ranging from 14" x 14" to 14" x 26" and from 16" x 16" to 16" x 28", the 4" increments between successive members of the series being provided by the supplemental sectional area such as A, B or C.

Figures 10 and 11 illustrate two members of a series of girders all of which have a portion of their sectional area in common. This portion is the full sectional area of the girder shown in Figure 10, designated d. The sectional area of the girder shown in Figure 11 is made up of the area d plus a rectangular superposed supplemental sectional area D above the chain line e. The horizontal dimension of the area D is less than the maximum width of the area d. This provides the girders shown in Figure 11 with shoulders or shelves 15 extending along the sides thereof. Similarly, the upper edges of the girder of Figure 10 provide shelves. Additional members of the series of girders have supplemental sectional areas similar to that shown at D but greater in depth, and while I have illustrated only two members of the series of girders, it will be understood that almost any number of such members differing from each other by a predetermined increment such as 4" in the depth of the supplemental sectional area D, may be provided as in the case of the columns shown in Figures 1 through 9.

The girders shown in Figures 10 and 11 have pipe lengths 16 embedded in pairs adjacent the ends thereof and nut sockets 17 in the upper face thereof in alignment with the pipe lengths, to receive anchor rods and nuts in the same manner as explained for the columns.

Figures 12 and 13 illustrate the principles of my invention as applied to a series of joists. The joist of Figure 12 has a sectional area designated f while that of Figure 13 has a sectional area identical with f plus a supplemental rectangular sectional area F. Other members of the series of joists are similarly designed, having a supplemental sectional area of progressively greater depth. Each joist of the series has a transverse pipe length 18 embedded in each end thereof adapted to cooperate with connection means carried by the columns and girders.

Figures 14 and 15 show members of a series of intermediate beams differing in the same manner as the joists of Figures 12 and 13.

Figures 16 and 17 similarly show members of a series of main beams or secondary girders. The members of the series illustrated in Figures 14 through 17 have pipe lengths 16 and nut sockets 17 adjacent each end.

Figures 18 and 19 illustrate two members of a series of wall panels or floor and roof slabs. The panels have tongues 19 along two adjacent edges and grooves 20 along the remaining edges. A factory-applied sealing strip or layer 21 extending along the tongue 19 and groove 20 makes the joints between adjacent panels weather-tight. As with the columns and girders, the sectional area of the slab of Figure 19 is the same as that of the slab of Figure 18, designated g, plus a rectangular supplemental sectional area G. The sectional area g of the slab of Figure 18 has sides which taper from the tongue and groove toward the adjacent face of the slab. The panels may have pipe lengths or double nuts embedded in their ends for receiving connections to columns.

Figure 20 illustrates another of the building members contemplated by my invention. It is a hollow concrete block 22 which may conveniently be molded over a core in the form of a box 23 of corrugated board or a mass of expanded cement, granulated slag, or other suitable material. Municipal building codes vary considerably in the required thickness of building walls and foundations. Some codes require 12" basement walls, for example, while others permit 10" or even 8" walls. The blocks 22, accordingly, have the nominal dimensions 8" x 10" x 12" and all the faces thereof are plane. The blocks may, therefore, be laid so that a single thickness provides the required wall thickness, i. e., 8", 10" or 12". The core 23 may be waterproofed and may be formed of or filled with material having thermal insulating qualities. In addition, I may also utilize vertically spaced, aluminum-covered asphalt paper boards to insulate the blocks, these boards being secured at their ends to the cores 23.

Figure 22:
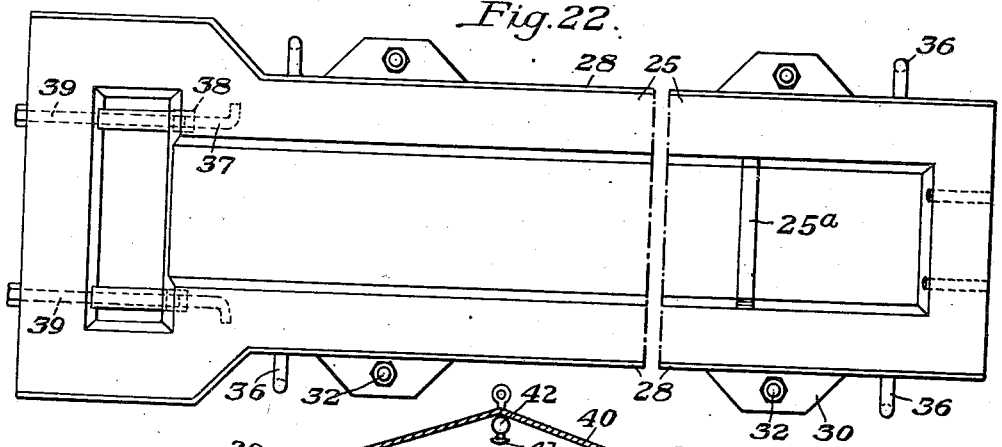
Figure 22 is a plan view of the bottom member of the mold.
Figure 23:
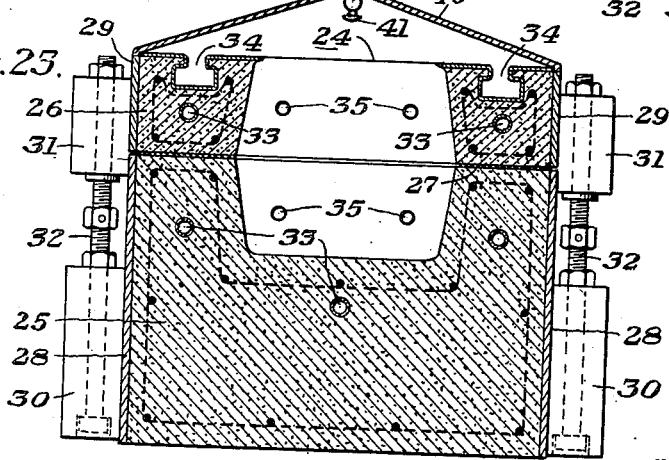
Figure 23 is a transverse section through the mold showing the upper and lower members secured together with a supplemental cover member thereon.

Figures 21 through 23 illustrate a form according to my invention for making columns such as those shown in Figures 1 through 4. The form, indicated generally at 24, comprises a bottom member or base 25 and an upper member 26. These members are made of concrete by use of suitable molds and cores and have a sealing gasket 27 disposed therebetween. Thermal insulating boards 28 and 29 overlie the sides of the form members, being bonded thereto in any convenient manner. Hubs 30 and 31 having portions embedded in the form members receive jack screws 32 whereby the upper member of the form may be clamped tightly against the lower member or forcibly raised therefrom. Both members of the form have longitudinal and transverse reinforcing bars embedded therein as well as heating pipes 33 adapted to be connected to a suitable source of heating medium such as a steam boiler. An end wall 25a is adjustable along the forms.

The upper member 26 has longitudinal slots 34 extending therealong formed by suitable sheet metal channels embedded in the concrete forming the member. The lower member 25 may have similar slots. These slots accommodate the heads of tie bolts for securing cross walls in adjusted position along the length of the forms or for securing supplemental forms where it is desired to form girder-supporting brackets integral with the columns. Holes 35 are formed in the members 25 and 26 at one end thereof adapted to receive rods for supporting the cross walls in adjusted position. Lifting eyes 36 are embedded in the sides of the form members for the attachment of lifting means such as crane hooks.

As shown in Figures 21 and 22, the form members 25 and 26 are enlarged at one end (the left-hand end) to provide the integral base of the column, as shown in Figures 1 through 9. Anchor bolts 37 having double nuts 38 partially threaded thereon are embedded in the form members adjacent the enlargement of the recesses therein adapted to accommodate the column base. Bolts 39 are inserted through holes in the outer ends of the form members and threaded into the nuts 38 after pipe lengths 14 have been placed thereon, as well as suitable tapered hollow members adapted to form the nut socket such as that shown at 17 in Figure 10. After the molding operation has been completed, the bolts 39 are unscrewed and pulled out to free the column which has been cast for removal from the mold. A removable cover 40 of metal plate is disposed on the upper form member 26 and has water sprays 41 spaced along a supply pipe 42 extending longitudinally thereof. These sprays supply water to the exposed surface of the column during curing and thus prevent cracks which might result from dehydration and uneven shrinkage.

In using the forms shown in Figures 21 through 23, the molding recess is filled with suitable concrete after the placement of the necessary reinforcing bars. The curing cover 40, is removed during this portion of the operation. When the pouring has been completed, the cover is replaced and steam delivered to the pipes 33. When the curing has been completed, the cover 40 is removed and the jack screws 32 operated to forcibly raise the upper member 26. When it has been loosened, it is lifted off and the molded column is then withdrawn from the lower form member. This is made possible by the taper or draft of the sides of the molding recess in the bottom member. This draft also facilitates the removal of the upper form member. After the molded column has been removed, the form members are reassembled, the upper member being drawn tightly down on the lower member preparatory to a further molding cycle.

Figure 24:
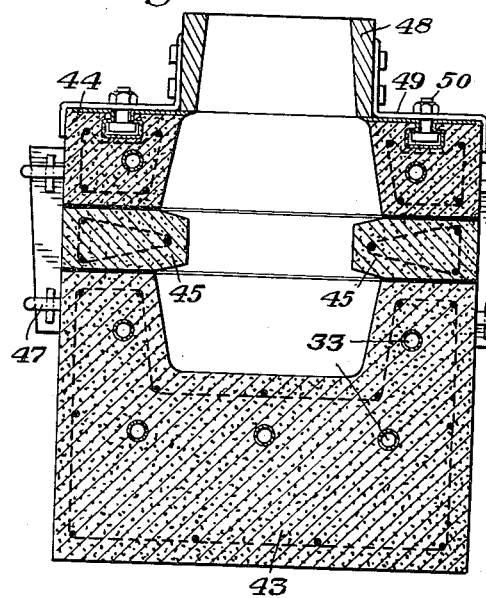
Figure 24 is a view similar to Figure 23 showing the column mold assembled with supplemental mold parts.

Figure 24 shows forms similar to those of 21 through 23 with supplemental members. Lower and upper form members 43 and 44 have a spacer or filler member 45 therebetween, the upper and lower members being held together by wedges 46 passing through eyes 47 embedded in the form members. The inner edges of the supplemental filler member 45 project inwardly beyond the walls of the recesses in the form members 43 and 44. The inwardly projecting edges of the filler member form grooves in opposite faces of the column adapted to receive the ends of wall panels. In addition, the filler 45 provides an additional or supplemental sectional area A, for example, between the spaced tapering portions of the sectional area of columns such as those shown in Figures 5, 7 and 9. A supplemental form member 48 has straps 49 secured thereto adapted to be engaged by tie bolts 50. The member 48 is simply a box of suitable shape adapted to be positioned at any desired location along the length of the form 44 to provide an integral shoulder or bracket on the column for supporting a girder or the like.

Figure 25:
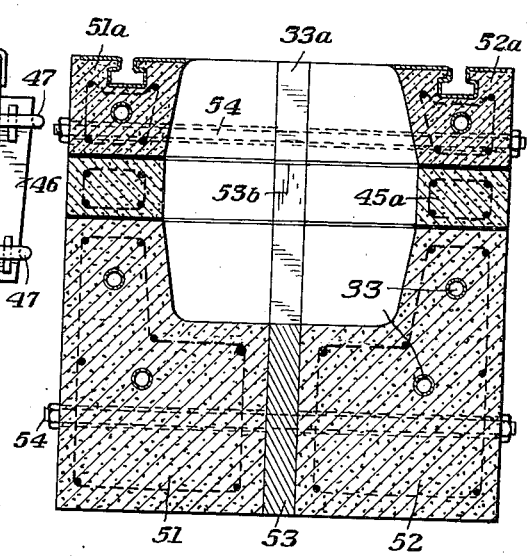
Figure 25 is a view similar to Figure 24 showing assembly of the molded members with different supplemental parts.

Figure 25 shows column forms somewhat similar to those of Figures 23 and 24. The bottom member of the form, however, is composed of separable parts 51 and 52 whereby a spacer 53 may be disposed therebetween. The upper form member is similarly composed of separable members 51a and 52a with a spacer 53a therebetween. Between the upper and lower form members a filler member 45a is disposed including separable members and a spacer 53b therebetween. Tie bolts 54 extending through pipe lengths embedded in the form members secure the latter and the spacers firmly together.

It will be apparent that by using spacers 53, 53a and 53b of various thicknesses, a plurality of different sizes of columns may be made with the same forms. Similarly, the filler 45a may be replaced by similar filler of greater or less thickness.

Figure 26:
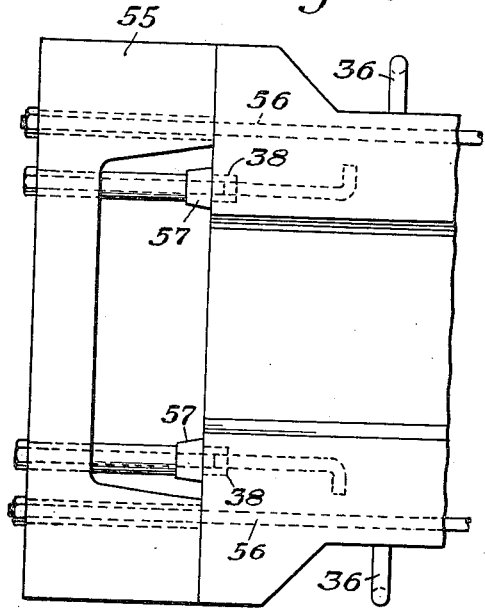
Figure 26 is a partial plan view of a modified bottom member of a column form generally similar to the form shown in Figure 22.

Figure 26 shows a modification of the column form in respect to the mold recess for the column base. In the structure of Figure 26 this recess is formed by separate supplemental form members 55 secured to the main form members by tie rods 56 projecting from the ends of the latter and through pipe lengths embedded in the supplemental form members. Figure 26 also shows clearly the matter in which the tapering plugs 57 are positioned on the bolts 39 to provide the nut sockets at the upper ends of the pipe lengths 14 embedded in the column bases. The supplemental form members 55 may be integral instead of separate pieces and are preferably of precast concrete. This type of form makes it possible to provide metal base plates for the columns instead of integral cast concrete bases. For this type of column, the base plates are secured to the column reinforcing bars and are held against the ends of the form by bolts threaded into the nuts 38.

Figure 27:
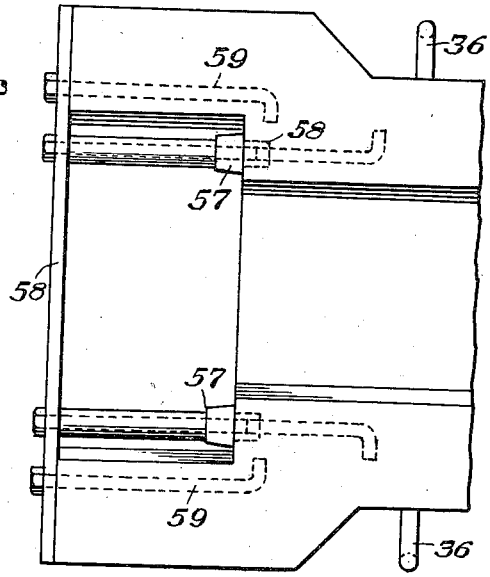
Figure 27 is a view similar to Fig. 26 showing a still further modified bottom member of a column form.

Figure 27 shows a further modified column form which is similar to that shown in Figures 21 through 23 except that the form members have end walls 58 in the form of metal plates secured to the form members by anchor bolts 59.

All the different types of column forms may be made "double-ended," that is may have molding recesses at both ends for forming column bases. This is desirable particularly when short columns are being made.

Figure 28:
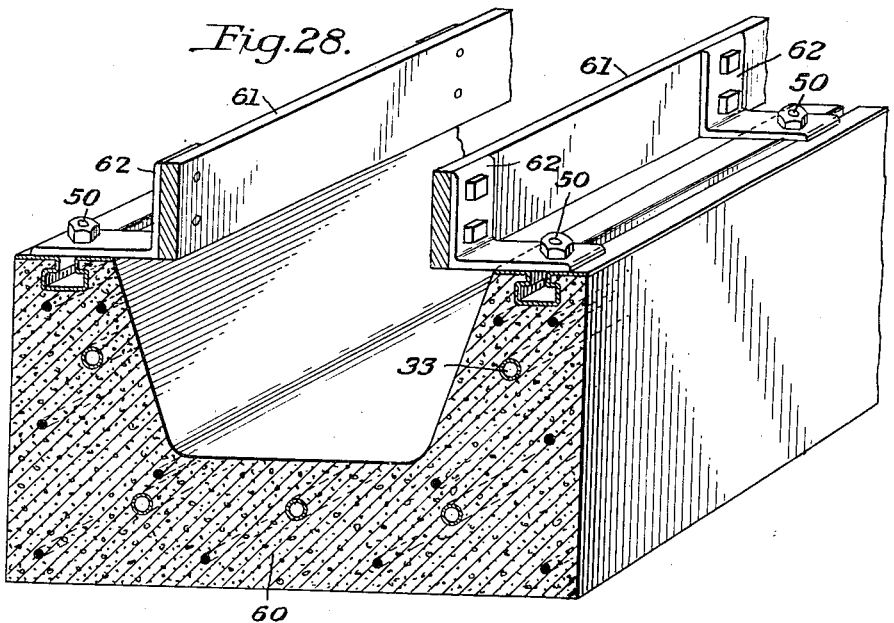
Figure 28 is a sectional perspective of a modified form showing the assembly therewith of supplemental parts adapting the form to the casting of girders.

Figure 28 illustrates a form 60 suited for making girders such as shown in Figures 10 and 11. The form 60 is similar to the bottom member 25 of the form 24 and the latter may, in fact, be utilized for making girders. Detachable side walls 61 are supported on angle brackets 62 in case it is desired to make a girder of the section indicated in Figure 11. The brackets 62 are secured and positioned by tie bolts 50. Girders of various overall depths may be made in the form shown in Figure 28 by filling the latter to different levels on the side walls 61, or by changing the side walls as required to give the desired height of the added sectional area D.

Figure 29:
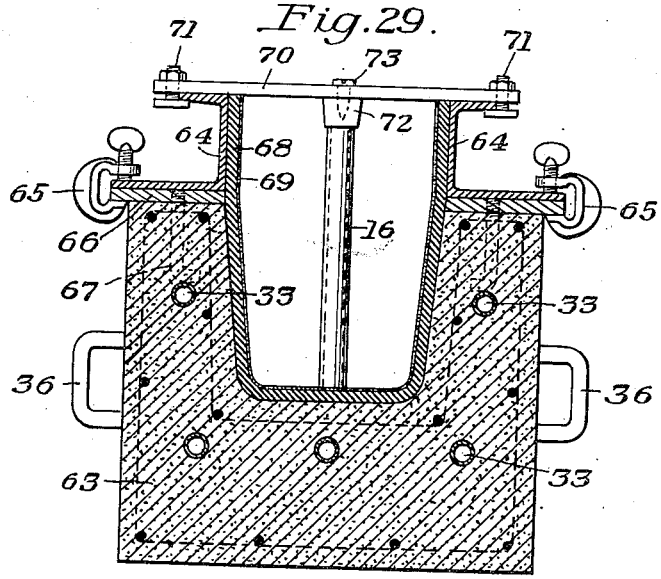
Figure 29 is a transverse section through a form adapted for the molding of the members shown in Figures 16 and 17.

Figure 29 illustrates a form for making beams such as those shown in Figures 16 and 17. The form includes a precast concrete body 63 having removable side walls 64. The latter are secured by clamps 65 to top plates 66. These plates are secured to the body 63 by anchor bolts 67. It will be apparent that the form shown in Figure 29 may be utilized without the side walls 64 to produce the beam of Figure 16, and that additional side walls of greater depth may be utilized to produce beams having a greater overall depth than that of Figure 17.

Figure 29 also illustrates a further modification of the molding practice contemplated by my invention. I provide an absorbent lining layer 68 inside the mold recess of the form having a cover or sheathing of fabric 69, such as muslin, thereover. The absorbent lining may be of fibrous material such as pressed fiberboard. It serves to absorb excess water from the concrete in the mold thereby eliminating water pin holes. The fabric layer 69 provides a highly finished surface on the molded members. Heating pipes 33 in the body of the form drive off the water absorbed by the lining 68, between molding operations, in the form of water vapor. As an alternative to the lining 68, the body 63 of the form may be made of absorbent material such as porous concrete which will also absorb excess moisture from the concrete in the mold recess.

Figure 29 also illustrates a means for supporting pipe lengths 16 to be embedded in the ends of the beams shown in Figures 14 through 17. Cross bars 70 are secured to the side walls 64 adjacent the ends thereof by clamping bolts 71. Tapered plugs 72 are secured to the cross bars by screws 73 and the pipe lengths 16 are wedged between the plugs 72 and the bottom of the mold recess.

Figure 30 illustrates a modified arrangement for securing a pipe length and a member for forming a nut socket in proper position in a form. A cross channel 74 is secured to the sides of the form in the same manner as the bar 70 in Figure 29. A bolt 75 extends downwardly through the channel, the nut-socket forming member 72 and a spacer sleeve 76. A pipe length 16 is disposed over the lower end of the bolt and spacer sleeve 76 and the channel is secured to the form. Reinforcing bars 77 may be bent around the pipe length 16 and welded thereto. When the molded member, e. g., a beam such as shown in Figure 16, designated 78, has set, the channel 74 is unclamped and the bolt 75 and spacer sleeve 76 withdrawn.

Figure 31 shows a further modified form 79 particularly suited for molding a hollow floor slab 80 designed for relatively long spans and having sides which converge upwardly. The form 79 is of concrete and has a recess 81 therein with side walls which converge downwardly similar to the recesses in the forms 25 and 60. The form 79 has an interior space 82 for a heating medium such as steam supplied through inlets 83. A drain hole 84 is provided for the discharge of condensate.

In order to make slabs 80, I employ detachable side walls 85 tapering downwardly to a feather edge. Anchor brackets 86 are secured to the side walls 85 and are adapted to be anchored to the top plate 66' of the form by clamps 65'. When a slab 80 has been molded in the form, it may be removed therefrom with the side walls 85, after removing the clamps 65. After removal of the side walls and the molded slab, the side walls 85 are removed from the slab. This form is particularly suited for molding members having recesses in their sides, such as indicated at 87. These recesses are formed by ribs projecting from the side walls 85. Slabs of various depths may be made by suitably choosing the width of the side walls 85.

Figure 32 is a further modified type of form somewhat similar to that shown in Figure 29 except that it is composed of two members 88a and 88b. The form members are shaped to define a mold recess 89. The form members abut only at the inner edges thereof adjacent the bottom of the recess 89. The inner faces of the form members slope outwardly toward the bottom and the space therebetween is filled by a compressible strip 90 of triangular section. Tie bolts 91 secure the form members together. When a member has been molded in the form shown in Figure 32 it may be removed therefrom by tightening up the nuts on the bottom tie bolts to compress the strip 90 and cause the sides of the mold recess to take positions at acute angles to each other. This breaks the bond between the form members and the molded member and facilitates removal of the latter. The form of Figure 32 is particularly useful for making members which must have parallel sides.

Figures 33 and 34 illustrate a sectional form including corner members 92a and 92b and a central member 93. The corner members have slots 94 along the sides thereof for the same purpose of the slots 34 in form member 26. The form members are held in assembled relation by tie bolts 54 passing through embedded pipe lengths. When it is desired to make members of minimum width, the corner form members 92a and 92b are used without the central member 93. For wider members, the central form member is employed, its width being determined by the desired width of the molded member. It will be apparent that members 93 of various widths may be used singly or in combination and that tie bolts of suitable lengths will be provided.

Figure 35 shows a form suited for making special members such as sills and coping. This form comprises corner members 95a and 95b and a central member 96. In addition, an angular filler 97 is disposed between the form members 95b and 96. The tie bolts 98 extend through embedded pipe lengths and secure the form members together. The corner members have side walls 99 and 100. The form member 96 has a longitudinal rib 101 adapted to receive a removable groove-forming member 102. The member 102 forms drip grooves in the sills and coping. A central partition including telescoping members 103 and 104 forms two mold recesses suited, respectively, for the molding of sills and coping. The member 103 is supported at the proper level relative to the member 104 by blocks 105. Figure 35 also shows the use of a paper or fabric layer 69 for lining the mold recesses. Pins 106 extend through the end walls of the mold whereby the end walls will be raised when the molded members are removed by a straight lift after detaching the side walls 99 and 100. The partition wall members 103 and 104 and groove-forming member 102, are removed with the molded members and the latter are then separated therefrom.

Figures 36 and 37 illustrate a reversible form 107. This form is provided with trunnions 108 whereby it is journaled in wheeled supporting standards 109 adapted to travel along a suitable track. On one face, the form has mold recesses 110 suited for the formation of members such as slabs of channel section. A removable wall member 111 of T section is disposed in a groove between adjacent mold recesses. The other face of the form is provided with mold recesses 112 suited for the formation of fence posts or the like. End plates 113 are secured to the form by bolts threaded into double nuts embedded in the form, the nuts being partly threaded on anchor bolts as described in Figures 21 and 22. Pins 114 extend through the end walls to prevent the molded articles from being dumped on tilting the form. Thus the molded members may be removed after reversing the form by pulling out the pins 114. The mold recesses 110 and 112 have sufficient draft to facilitate removal of the molded articles. The form 107 has heating pipes 115 embedded therein. Pins 116 removably inserted in the standards 109 hold the form in horizontal position for filling.

Figures 38 through 40 illustrate a further modified form. This form includes a curing chamber having side walls 117a and a bottom 117b, conveniently of concrete. Concrete slabs 118 extend across the curing chamber and are supported on the side walls thereof. The slabs have mold recesses 119 therein for making channel-section slabs such as those made in recesses 110 of form 107. Spacers 120 of T section are disposed between adjacent slabs 118 and fillers 121 may be disposed in the portions of the mold recess adapted to form the legs of the channel-section slabs. Anchor bolts 118a embedded in the ends of the slabs 118 protrude below the lower surface thereof and are adapted to fit into sockets formed by pipe lengths 122 embedded in the side walls 117a.

The depth of the channel-section slabs molded in the form of Figures 38 through 40 may be varied by substituting spacers 120a, the horizontal portions of which have various thicknesses. It will be apparent that the molded members may easily be removed after removal of the spacers 120 or 120a. It will be understood that a heating medium, such as steam will be applied to the curing chamber by pipes 123. A drain for condensate is formed at 124. Rails 125 are laid along the side walls 117a for a travelling mixer or hopper. These rails may also be used for a travelling screed and vibrator. Cushion strips of rubber or the like may be disposed between the forms 118 and the side walls 117a to permit vibration of the former.

A fixed end wall 126 is secured at one end of each mold chamber by brackets 127. An adjustable end wall 128 is movable adjacent the other end of the form by a threaded shaft 129 having adjusting nuts thereon and extending through a bracket 130. The brackets 127 and 130 are secured to the forms in the same manner that plates 113 are secured to form 107.

Figure 41 illustrates a form 131 for making wall panels such as those shown in Figures 18 and 19 and that illustrated in Figure 42. The form comprises a concrete body having a mold recess 132 therein and detachable side walls 133 having ribs and grooves for forming the tongues and grooves along the sides of the panel. Supplemental side walls 134 are detachably secured to the walls 133 to permit panels of various thicknesses to be made in the same form.

Figure 42 illustrates a panel of minimum thickness at 135. The size of a thicker panel is indicated by the chain line 136. The recess 132 in the form 131 has tapering sides the same as the recesses in the forms 25, 60, etc. Steam pipes 137 are embedded in the form to facilitate curing. The side walls 133 are suitably hinged at the corners to permit their removal from the molded panel.

Figures 43 through 45 illustrate a further modified form. This form indicated generally at 138 includes a platform 139 extending between spaced rockers 140 rolling on rails 141. The platform and rockers are of reinforced concrete and are cast integral. Steam pipes 142 are embedded in the platform to facilitate the curing of articles molded thereon.

Removable side walls 143 and 144 are attached to the platform 139. The side walls have holes or slots adapted to receive the upwardly projecting ends of anchor bolts 143a embedded in the platform 139 and are held thereon by nuts threaded on the anchor bolts and seated on the bottom of nut recesses formed in the side walls at the upper ends of the holes therethrough. A metal plate 145 is disposed on the platform before the side member 143 is put in place. The plate has its edges turned up as at 146 and a strip 147 extending along one edge and welded thereto. The strip 147 is flanged over at 148. When the plate 145 and side members 143 and 144 have been placed on the platform 139 the mold recess formed thereby is filled. After setting of the molded panel the platform is tilting on its rockers to a vertical position. Sills 149 between rail 141 and slightly higher than the latter are engaged by the side wall 144 and the molded slab is thereby transferred from the platform to the sills. The flanged-over edge 148 of the plate 145 prevents the panel from sliding off the platform until it reaches vertical position. Side wall 144 may be adjusted laterally of the platform 139 by screws 150 working in nuts embedded in projections 151 at one side of the rockers 140. When the platform 139 has been tilted to vertical position, the molded panel may easily be removed therefrom. In fact, this removal is more or less automatic by virtue of the engagement of side wall 144 with the sills 149. Links 152 pivoted to a standard 153 have notches therein adapted to engage the tongues on the edges of the panels whereby to hold them in spaced relation during curing or aging.

Figure 46:
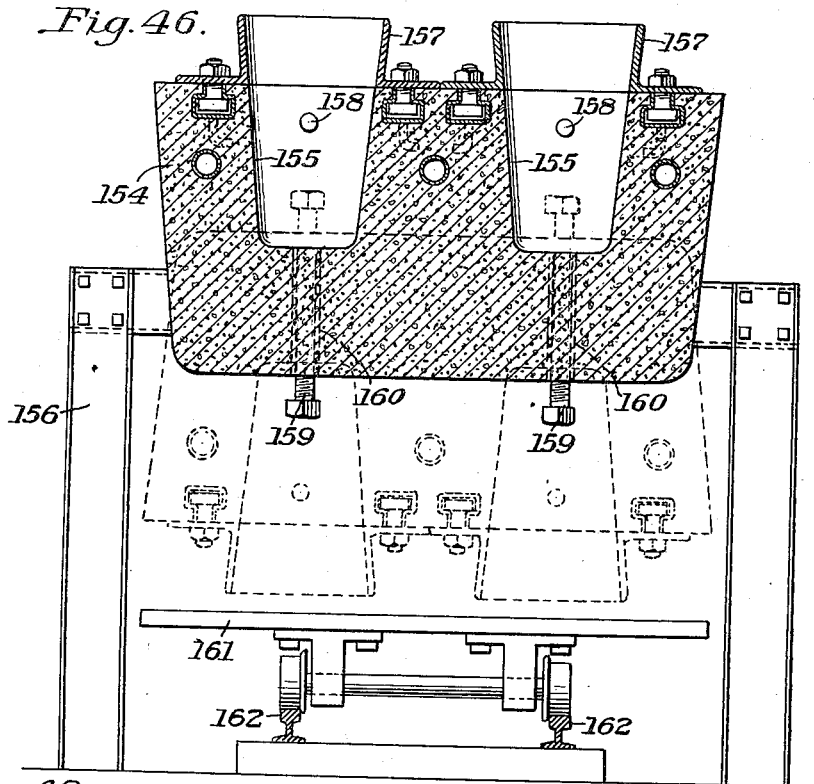
Figure 46 is a transverse section through a form somewhat similar to that of Figure 29 except that it is mounted for tilting.

Figure 46 shows a further modified form 154 of reinforced concrete having a plurality of mold recesses 155 therein and pivoted on a supporting frame 156 so it can be reversed. Side walls 155 are detachably secured adjacent the recesses 155 to permit the molding of members of various depths. Pins 158 project inwardly from the end walls to prevent the members from dropping out on the reversal of the form. Ejecting screws 159 are threaded into tubes 160 embedded in the form. When the screws are turned, they serve to force the molded members out of the form. A car 161 travelling on rails 162 below the form is adapted to receive the molded members as discharged from the form.

Figure 48:
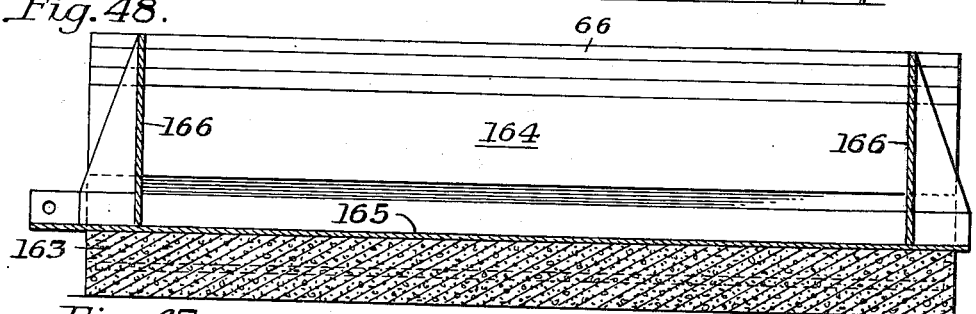
Figure 48 is a central longitudinal section through the form of Figure 47.
Figure 47:
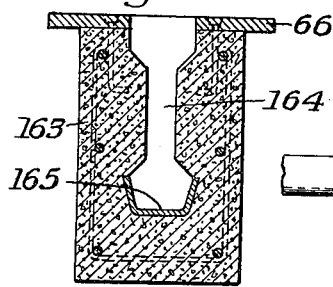
Figure 47 is a transverse section through a slab form having a bottom support or pallet which is slidable lengthwise of the form.
Figure 49:
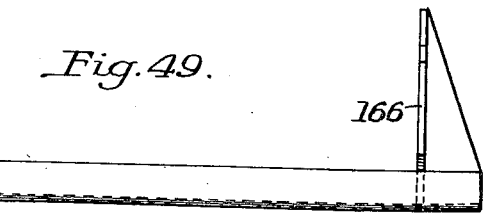
Figure 49 is a side elevation of the bottom support or pallet of the form of Figures 47 and 48.

Figures 47 through 49 illustrate a further modified form. This form comprises a concrete body 163 having a mold recess 164 therein and a top plate 66 anchored thereto. The recess 164 is shaped to form slabs having enlarged edges or flanges with a connecting web therebetween. A pallet 165 is movable lengthwise in the bottom of the mold recess 164 and may conveniently be composed of sheet metal of channel section. Preferably the pallet has end walls 166, one of these rigidly secured thereto and the other preferably adjustable. The pallet is positioned as shown in Figure 48 preparatory to filling the mold. After the mold has been filled and the molded member has become set, the pallet and member are withdrawn by pulling endwise on the former. The molded member is left in the pallet until fully cured but the mold may again be used with another pallet. The endwise movement of the mold member assures the formation of good corners thereon.

Figure 50:
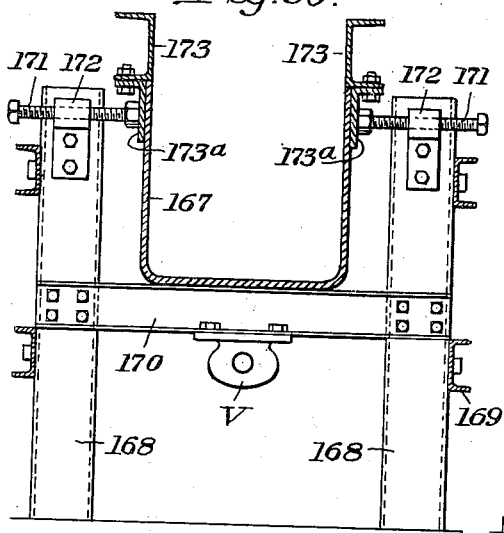
Figure 50 is a transverse section through a form composed of metal plate which is particularly useful for casting building members in the field.

Figure 50 illustrates a form particularly suited for use in the field as opposed to factory installations, for which the concrete molds previously described are better adapted. The form comprises a channel 167 of metal plate supported in a frame including posts 168, rails 169 and cross members 170. The sides of the form 167 are normally held in the desired position relative to the bottom by adjusting screws 171 threaded through brackets 172 on the posts 168. Retraction of the screws 171 suffices to pull the sides of the form away from the member molded therein and thereby facilitates its removal. The resilience of the metal plate constituting the form permits sufficient deformation for this purpose. The sides are preferably retracted slightly while the form is being filled and then drawn in to normal position compressing the mix. Supplemental side walls 173 may be employed to make members of various depths. These side walls are bolted to brackets 173a secured to the edges of the form. Vibrators V may conveniently be mounted on the cross members 170.

Figure 51:
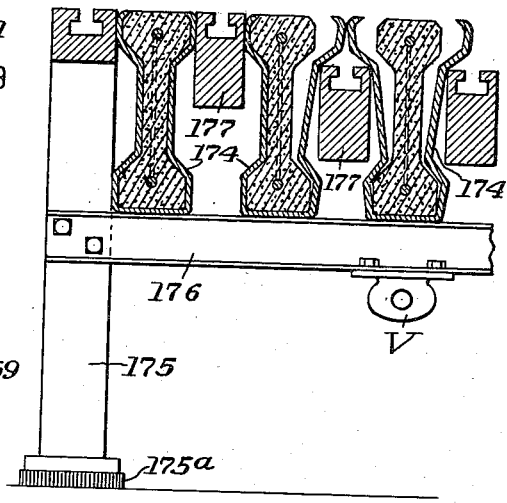
Figure 51 is a transverse section through a series of sheet metal forms adapted for the molding of slabs similar to those produced in the form shown in Figures 47 and 48.

Figure 51 illustrates a multiple form including a plurality of mold chambers 174 formed of metal plate and disposed side-by-side on a supporting frame including posts 175 and rails 176. The posts have rubber feet 175a. The mold chambers, as shown in Figure 51, are shaped to produce members such as those made in the form of Figures 47 through 49, and are so made that their sides normally tend to spring apart, as shown on the right in Figure 51. They are preferably filled with a cementitious mix when the sides are open. Movable spacer blocks 177 are disposed between mold chambers and when raised, as shown at the left in Figure 51, force the sides of the mold chambers in proper relation for a molding operation. This compresses the concrete previously supplied. After setting of the molded members, lowering of the blocks 177 permits the sides of the mold chambers to separate from the members by virtue of the resilience of the metal plates forming the mold chambers.

Figure 52:
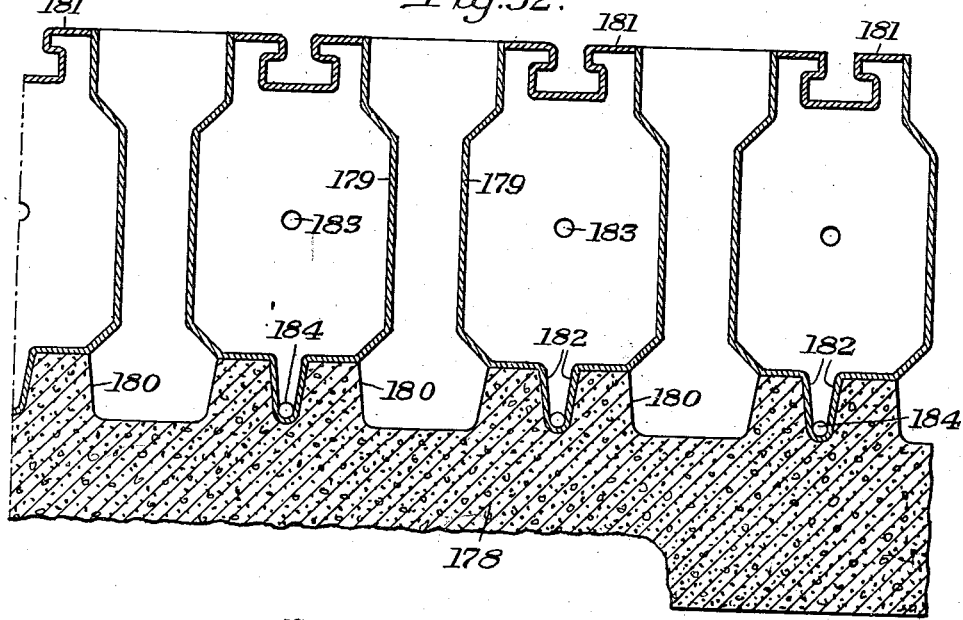
Figure 52 is a transverse section through a different type of multiple form including side walls of metal plate and a concrete base.

Figure 52 shows a multiple form having a concrete base 178 and spaced side walls 179. Troughs 180 cooperate with the side walls 179 in forming a plurality of mold chambers. The adjacent side walls of neighboring mold chambers are of unitary construction and include a top plate 181 shaped to provide a slot of inverted T section therein similar to that provided at 34 in form member 26. The assemblies of the side walls of the mold chambers have downwardly projecting ribs 182 adapted to enter similarly shaped grooves in the body 178 between the recesses 180. Connections 183 extend from the side wall assemblies to a source of heating fluid such as steam and a condensate discharge connection 184 is provided at the bottom of the rib 182.

When the members molded in the recesses of the form shown in Figure 51 have set, the side wall assemblies are lifted with the molded members therebetween. The latter are then separated from the side wall assemblies and the assemblies replaced on the body of the form.

Figure 53:
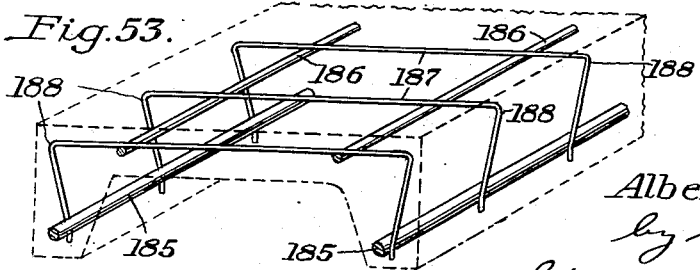
Figure 53 is a diagrammatic perspective showing the method of forming the reinforcing mesh of a channel-section slab so that it will be self-supporting and self-positioning in the form.

Figure 53 illustrates a formation of a reinforcing mesh for a channel section slab such as made in the forms illustrated in Figures 36 and 38, whereby the reinforcing is self-positioning. Mesh composed of longitudinal bars 185 and 186 and transverse bars 187 is cut and bent as shown in the drawings. The bars 187 are cut with their ends projecting beyond the bars 185 so that when the ends of the bars 187 rest on the bottom of the form, the bars 185 and 186 are spaced above the bottom of the form. At the same time the bars 187 are bent so that its bends 188 therein engage the sides of the form and thereby position the reinforcing mesh transversely.

In using the forms of my invention for making precast concrete members, I subject a cementitious mix deposited in the form to vibration to insure that the mix flows entirely around the reinforcing members and fully fills all parts of the forms. Preferably I apply vibration to the reinforcing, such as the mesh shown in Figure 53, placed in the form before deposition of the mix. The vibrator is firmly clamped to the mesh.

My invention further contemplates subjecting the cementitious mix while in the forms to supersonic vibrations, i. e., either mechanical impact or air waves, having a frequency above the audible range, such as 20,000 vibrations per second. This accelerates the curing, apparently by effecting intimate contact between the water globules and the cement particles of the mix.

After the molded articles have become set and have been removed from the forms, I may subject them to high-frequency electromagnetic induction, e. g., by passing them through a coil traversed by an alternating current of a frequency in the range of hundreds of kilocycles. Such high-frequency induction causes internal heating of the articles and thus expedities curing uniformly throughout the entire mass. This avoids the injurious effect of shrinkage commencing on the exterior of the mass and proceeding inwardly thereof which results from the usual method of curing by the application of heat externally.

The shrinkage of concrete on curing tends to set-up excessive initial stress in the reinforcing bars, by reason of the bond between the concrete and the bars, before the application of any external load. This is particularly true in the case of columns. To avoid this condition, I may so calculate the sectional area of the reinforcing bars that they serve merely to hold the concrete of the columns together without carrying any of the actual load. The longitudinal reinforcing bars are coated with paint or asphalt to prevent bonding thereof to the concrete and to permit relative slippage therebetween. I may also place rubber caps on the ends of the longitudinal bars so they can move relative to the concrete. The transverse bars or tie rods in such case are not welded to the longitudinal bars but are left free from movement relative thereto.

It will be apparent from the foregoing description and explanation that my invention provides series of precast building members of various types necessary in the construction of buildings of the usual character, as well as several types of forms for the molding thereof. The precast members themselves are simple in form and inexpensive to manufacture and of such design as to render entirely practical the erection of a complete building thereby. The forms are suited to the molding of various members of the several series and certain forms may be employed for molding members of different series. Considerable economy in the number of different types of forms required is thus effected. In all the various types of forms I provide for the application of artificial heat to expedite curing of the molded members. I have also made special provisions for breaking the bond between the molded articles and the forms to facilitate removal of the former.

Although I have illustrated and described but a few types of precast members and the forms for the manufacture thereof, I think it will be understood that changes in the details of the various members and the forms therefor may be made without departing from the spirit of the invention or the scope of the following claims.

I claim:

1. A form for molding concrete members comprising a concrete body having a mold recess therein, and grooves formed in the top of said body and tie means engaging in said grooves for securing side walls extending above said body.

2. A form for molding concrete members such as columns comprising upper and lower form sections adapted to be superposed having mold recesses therein with side walls flaring toward the plane of division between said sections, the upper section having extension side walls secured thereon the inner surfaces of which flare downwardly.

3. A form for elongated concrete members such as columns or beams comprising an elongated concrete mold body having an elongated chamber therein, trough-shaped in section, with the sides thereof converging toward the bottom, and pipes spaced around said chamber, adjacent the sides and bottom thereof, and parallel thereto, said pipes serving as longitudinal reinforcement for said body and providing passages for a fluid heating medium.

4. A form for making concrete units comprising a concrete body having a mold recess therein, an absorbent layer on the surface of said recess, and heating means embedded in said body for driving off the moisture from the absorbent layer.

5. A form for elongated concrete members such as columns or beams comprising an elongated concrete mold body having an elongated chamber therein, a metal plate bonded to the top of said body and forming the margin of said chamber, supplemental side walls extending upwardly from said plate adjacent the sides of said chamber, and anchor means securing said side walls to said plate.

6. The apparatus defined by claim 5 characterized by said body being composed of two sections having horizontal meeting planes, and separable to admit a spacer member therebetween.

7. The apparatus defined by claim 5 characterized by said body being composed of two sections having horizontal meeting planes, and separable to admit a spacer member therebetween, the sides of the mold chamber in said sections converging away from said planes.

8. A form for making a concrete column or the like having a shaft and an integral base larger in cross section than the shaft, said form comprising a concrete body having a chamber therein adapted for molding said shaft, a concrete block having a base-forming recess therein secured to one end of said body, and tie rods embedded in the body and extending through said block for removably securing the latter to the former.

9. A form for making a concrete column or the like having a shaft and an integral base larger in cross section than the shaft, said form comprising a concrete body having a chamber therein adapted for molding said shaft, a closure member removably secured at one end of said body, pins on said member extending parallel to the length of said chamber, and pipe lengths removably disposed on said pins and adapted to be embedded in said base to form passages therein for anchor bolts.

10. The apparatus defined by claim 9 characterized by the inner ends of said pins projecting beyond said pipe lengths and into recesses in said body.

11. A form for making a series of elongated concrete members such as columns or beams having at least one portion of their sectional area in common and differing from each other by a supplemental portion of their sectional area, said form comprising an elongated concrete body having an elongated chamber therein adapted for molding the portion of the members the sectional area of which is common to the several members of the series, said body including a bottom section and a top section removable therefrom, and spacer means disposable between said sections adapted to form said supplemental portion of the sectional area of said members.

12. A form as defined by claim 11 characterized by said spacer means having inwardly projecting portions adapted to form grooves along the sides of said members.

13. A form for making a series of elongated concrete members such as columns or beams having at least one portion of their sectional area in common and differing from each other by a supplemental portion of their sectional area, said form comprising an elongated concrete body having an elongated chamber therein adapted for molding the portion of the members the sectional area of which is common to the several members of the series, said body including a pair of sections adapted to be disposed in abutment along a longitudinal plane of separation, and a spacer between said sections.

14. A form as defined by claim 5 characterized by said metal plate having its inner edges flush with said chamber and their outer edges projecting beyond said body.

ALBERT HENDERSON.